(12) United States Patent
Kim

(10) Patent No.: US 12,030,385 B2
(45) Date of Patent: Jul. 9, 2024

(54) ASSEMBLY STRUCTURE OF HYBRID TRANSMISSION

(71) Applicant: Hyundai Transys Inc., Seosan-si (KR)

(72) Inventor: Tae Hoon Kim, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 18/251,454

(22) PCT Filed: Dec. 8, 2021

(86) PCT No.: PCT/KR2021/018541
§ 371 (c)(1),
(2) Date: May 2, 2023

(87) PCT Pub. No.: WO2022/124796
PCT Pub. Date: Jun. 16, 2022

(65) Prior Publication Data
US 2023/0415560 A1    Dec. 28, 2023

(30) Foreign Application Priority Data

Dec. 8, 2020    (KR) .................. 10-2020-0170258

(51) Int. Cl.
*B60K 6/387*    (2007.10)
*F02F 11/00*    (2006.01)
*F16D 25/0638*    (2006.01)

(52) U.S. Cl.
CPC ............ *B60K 6/387* (2013.01); *F02F 11/007* (2013.01); *F16D 25/0638* (2013.01); *B60Y 2200/92* (2013.01); *F16D 2300/08* (2013.01)

(58) Field of Classification Search
CPC ......... B60K 6/387; B60K 6/405; F16D 13/52; F16D 25/0638; F16D 2300/26
See application file for complete search history.

(56) References Cited

U.S. PATENT DOCUMENTS

| 10,658,900 | B2 | 5/2020 | Mackowiak et al. | |
|---|---|---|---|---|
| 2002/0148695 | A1* | 10/2002 | Latsko | F16D 67/04 |
| | | | | 188/170 |
| 2012/0080286 | A1 | 4/2012 | Kasuya et al. | |
| 2012/0217122 | A1* | 8/2012 | Kasuya | B60K 6/48 |
| | | | | 903/902 |

FOREIGN PATENT DOCUMENTS

| JP | 2012-086826 A | | 5/2012 |
|---|---|---|---|
| JP | 2014224580 A | | 12/2014 |
| JP | 2017500838 A | | 1/2017 |
| JP | 2018157645 A | * | 10/2018 |
| KR | 10-2010-0015063 A | | 2/2010 |
| KR | 10-2014-0077261 A | | 6/2014 |

* cited by examiner

*Primary Examiner* — Stacey A Fluhart
(74) *Attorney, Agent, or Firm* — Bridgeway IP Law Group, PLLC; Jihun Kim

(57) ABSTRACT

The present invention provides an assembly structure of a hybrid transmission including an engine clutch retainer provided with an assembly hole; a coupling member assembled through the assembly hole; and a sealing cover configured to seal the assembly hole.

14 Claims, 4 Drawing Sheets

ASSEMBLY STRUCTURE OF HYBRID TRANSMISSION

TECHNICAL FIELD

The present invention relates to an assembly structure of a hybrid transmission.

BACKGROUND ART

In general, a hybrid vehicle refers to driving a vehicle by efficiently combining two or more different types of power sources. The hybrid vehicle refers to a vehicle that is driven by an engine that obtain rotational force by burning fuel (fossil fuel such as gasoline) and a motor that obtains rotational force by battery power.

The hybrid vehicle is being actively researched as a future vehicle that can reduce exhaust gas and improve fuel efficiency by adopting not only an engine but also a motor as an auxiliary power source.

The hybrid vehicle typically uses an engine and a motor. At low speeds, the motor with relatively good low-speed torque characteristics is used as a main power source, and at high speeds, the engine with relatively good high-speed torque characteristics is used as a main power source. Accordingly, the hybrid vehicle has excellent effects in improving fuel efficiency and reducing exhaust gas because an operation of the engine using fossil fuel is stopped and the motor is used in the low speed range.

A drive device for a hybrid vehicle includes driving modes such as an EV (Electric Vehicle) mode, which is a pure electric vehicle mode in which only the rotational force of the motor is used for driving, and an HEV (Hybrid Electric Vehicle) mode in which the rotational force of the motor is used as auxiliary power while using the rotational force of the engine as the main power, and mode conversion from the EV mode to the HEV mode is performed when starting the engine.

Meanwhile, in order to assemble a bearing for rotatably supporting an engine clutch retainer in an existing hybrid transmission, it is necessary to fix the bearing to the support by using a coupling member such as a bolt. In this case, since the engine clutch retainer is located between the bearing and an engine clutch piston, an assembly hole passing through from the engine clutch piston side toward the bearing is required for assembly of the bolt. When the assembly hole is provided in the engine clutch retainer, it is possible to easily perform an operation of inserting the bolt from the engine clutch piston side into the bearing side through the assembly hole and then fixing the bearing to the support with the bolt.

However, when the assembly hole is formed in the existing engine clutch retainer, operating oil supplied between the engine clutch retainer and the engine clutch piston flows out toward the bearing through the assembly hole, so an operating oil pressure required for the operation of the engine clutch cannot be formed, resulting in the inability to operate the engine clutch.

In view of the above situations, the present invention is to provide a mechanism for allowing the engine clutch to smoothly operate by blocking the assembly hole provided in the engine clutch retainer with a sealing cover, resulting in formation of an operating oil pressure between the engine clutch retainer and the engine clutch piston.

CITATION LIST

Patent Literature (Patent Literature 1) Korean Patent Application Publication No. 10-2010-0015063 (2010 Feb. 12)

DISCLOSURE

Technical Problem

In order to solve the above problems, the present invention is to provide an assembly structure of a hybrid transmission for allowing the engine clutch to smoothly operate by blocking the assembly hole provided in the engine clutch retainer with a sealing cover, resulting in formation of an operating oil pressure between the engine clutch retainer and the engine clutch piston.

Technical Solution

In order to achieve the above object, the present invention provides an assembly structure of a hybrid transmission including an engine clutch retainer provided with an assembly hole; a coupling member assembled through the assembly hole; and a sealing cover configured to seal the assembly hole.

In addition, the engine clutch retainer is located between an assembly target and an engine clutch piston.

Further, the coupling member is assembled through the assembly hole so that the assembly target is fixed.

Further, the engine clutch retainer is provided with an accommodation part to which the sealing cover is correspondingly coupled, and the accommodation part is provided on an engine clutch piston side so as to communicate with the assembly hole provided on an assembly target side and is configured as a hole larger than the assembly hole.

Further, a watertight member is provided on an outer circumference of the sealing cover, and the watertight member seals a portion in contact with the accommodation part.

Further, the sealing cover includes a through-hole provided at a center of the sealing cover; and a recessed part provided on a surface facing the engine clutch piston and recessed along a circumference of the through-hole.

Further, the recessed part includes a recessed surface provided with a tool engaging portion; an inner ring portion provided on an inner side of the recessed surface and configured as an inclined surface; and an outer ring portion provided on an outer side of the recessed surface, configured as an inclined surface and configuring an outer ring larger than the inner ring portion.

Further, the tool engaging portion is a rib.

Further, the assembly target is provided with a rim portion, and the rim portion is provided on an outer circumference of the assembly target and has a coupling hole to which the coupling member is correspondingly coupled.

Further, the engine clutch retainer is configured integrally with a motor rotor.

Further, the assembly target is configured to rotatably support the engine clutch retainer in a state of being fixed to the support by the coupling member.

Further, the assembly target is a bearing.

Further, the coupling member is a bolt.

Further, the engine clutch retainer is configured integrally with a magnet.

Advantageous Effects

The present invention can reduce noise and vibration of a hybrid vehicle and improve performance by strengthening the engine clutch retainer support by the assembly target such as a double ball bearing.

In addition, according to the present invention, the engine clutch can be smoothly operated by blocking the assembly hole provided in the engine clutch retainer with the sealing cover, resulting in formation of an operating oil pressure between the engine clutch retainer and the engine clutch piston.

<Explanation of Reference Numerals and Symbols>

Figure 1:
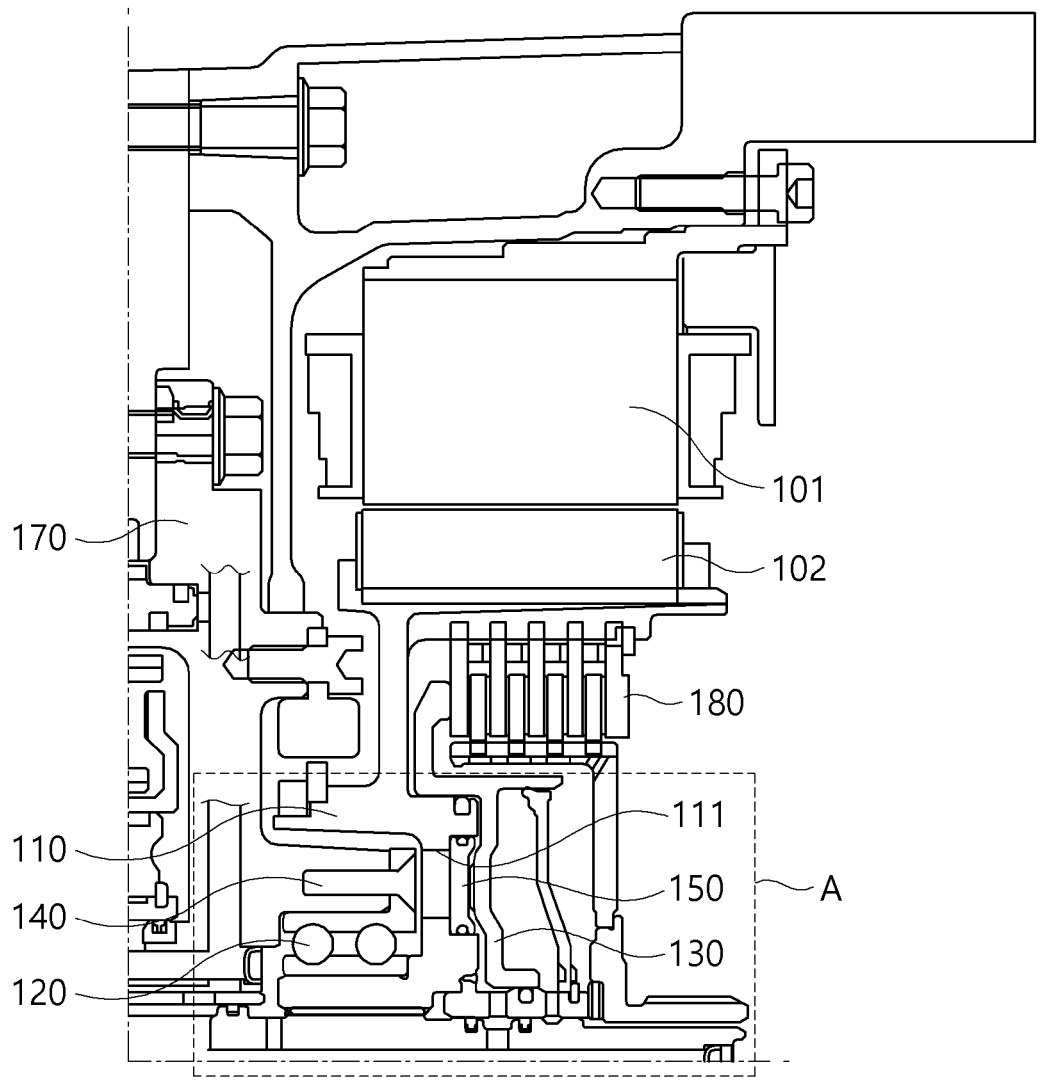
FIG. 1 is a view showing an overall configuration according to a preferred embodiment of the present invention.

| | |
|---|---|
| 101: motor stator | 102: magnet |
| 110: engine clutch retainer | 111: assembly hole |
| 112: accommodation part | 120: assembly target |
| 121: rim portion | 121a: coupling hole |
| 130: engine clutch piston | 140: coupling member |
| 150: sealing cover | 151: through-hole |
| 152: recessed part | 152a: recessed surface |
| 152b: tool engaging portion | 152c: inner ring portion |
| 152d: outer ring portion | 160: watertight member |
| 170: support | 180: clutch disk |
| P: operating oil pressure | |

BEST MODE

Hereinafter, preferred embodiments of the present invention will be described in detail with reference to the accompanying drawings. First, when adding reference numerals to components in each drawing, it should be noted that the same components have the same numerals as much as possible even if they are shown in different drawings. In addition, when describing the present invention, a detailed description of related known configurations or functions will be omitted if it is determined that the detailed description makes the gist of the present invention unclear. Further, although preferred embodiments of the present invention will be described below, the technical idea of the present invention is not limited thereto and can be modified and implemented in various ways by one skilled in the art.

When an assembly hole is formed in an existing engine clutch retainer, operating oil supplied between the engine clutch retainer and an engine clutch piston flows out toward a bearing through the assembly hole, so an operating oil pressure required for an operation of the engine clutch cannot be formed, resulting in the inability to operate the engine clutch. In view of the above situations, the present invention is to provide a mechanism for allowing the engine clutch to smoothly operate by blocking the assembly hole provided in the engine clutch retainer with a sealing cover, resulting in formation of an operating oil pressure between the engine clutch retainer and the engine clutch piston.

Figure 2:
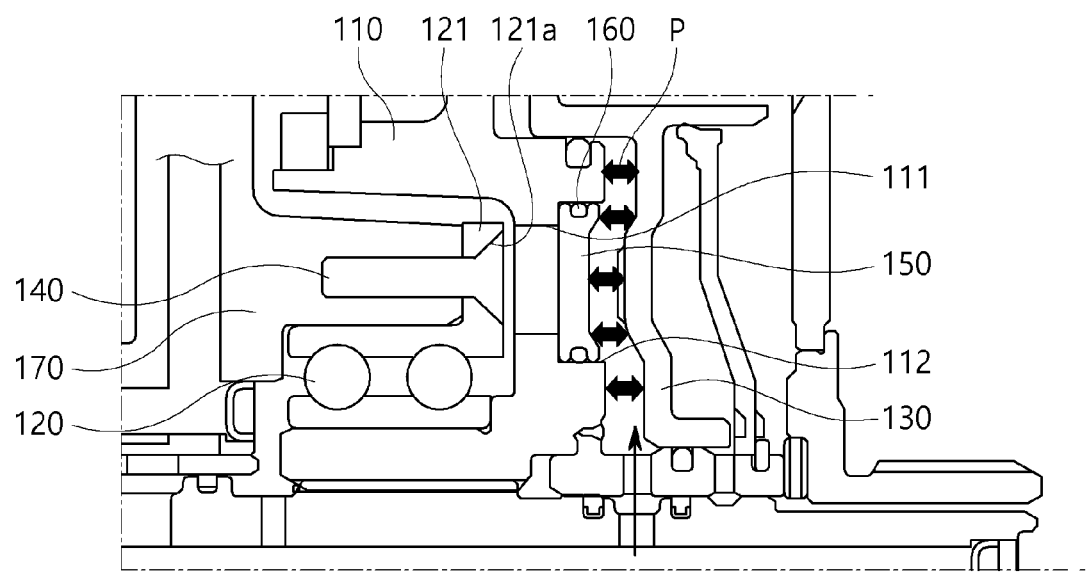
FIG. 2 is an enlarged view of an A part of FIG. 1.
Figure 3:
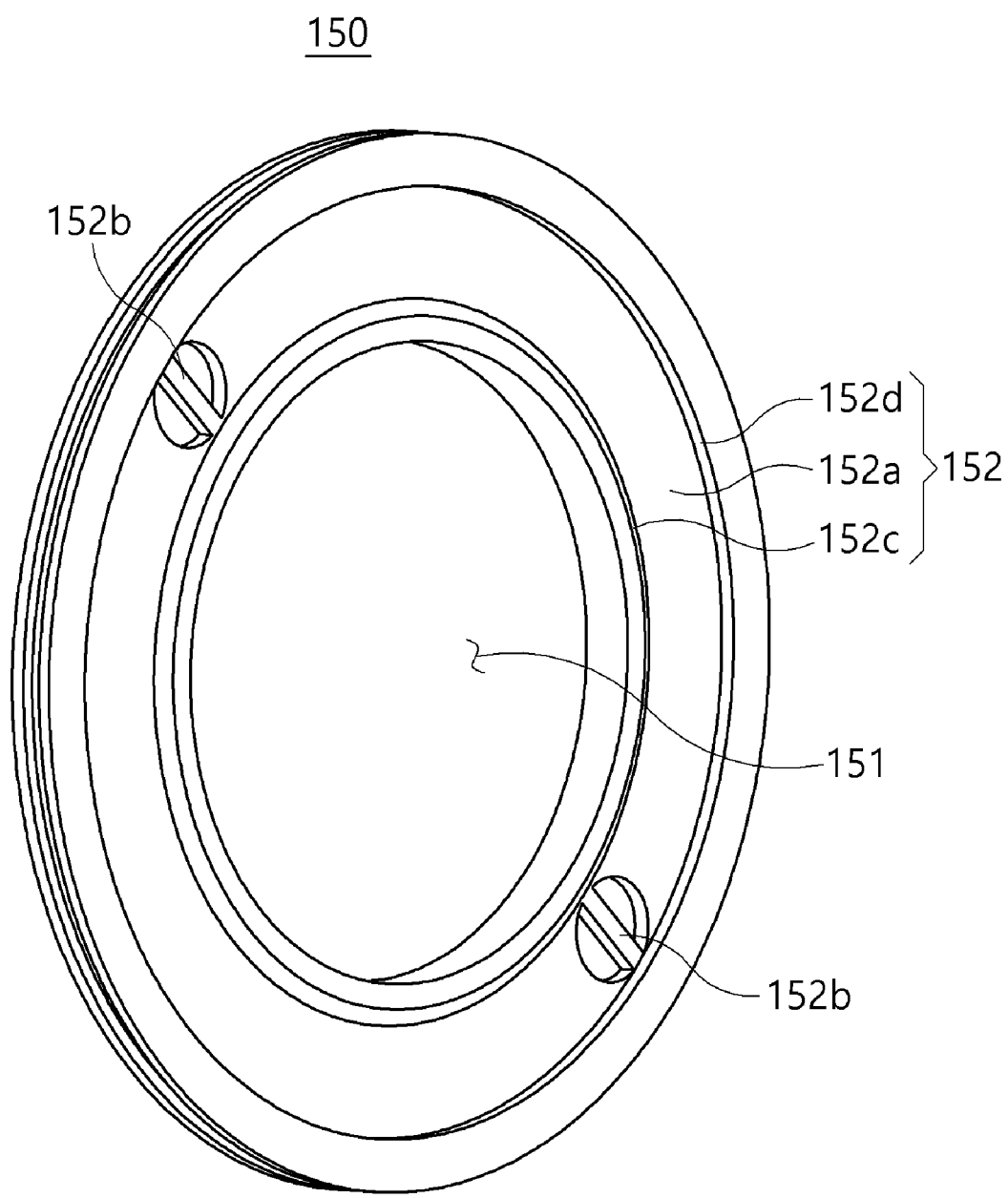
FIG. 3 is an enlarged view of a sealing cover according to a preferred embodiment of the present invention.

FIG. 1 is a view showing an overall configuration according to a preferred embodiment of the present invention, FIG. 2 is an enlarged view of an A part of FIG. 1, and FIG. 3 is an enlarged view of a sealing cover according to a preferred embodiment of the present invention.

As shown in FIGS. 1 to 3, the present invention has such technical features that an assembly hole 111 through which a coupling member 140 such as a bolt can pass is perforated in an engine clutch retainer 110, and after assembly of the coupling member 140 through the assembly hole 111 is completed, the assembly hole 111 is blocked with a sealing cover 150 to prevent oil leakage through the assembly hole 111, thereby preventing an operating oil pressure P of the engine clutch from leaking.

Specifically, the present invention includes an engine clutch retainer 110 having an assembly hole 111 and a coupling member 140 that is assembled through the assembly hole 111 so that an assembly target 120 is fixed.

The engine clutch retainer 110 is located between the assembly target 120 and an engine clutch piston 130 inside a hybrid transmission. As an example, the engine clutch retainer 110 may be configured integrally with a motor rotor. The assembly hole 111 of the engine clutch retainer 110 is formed penetrating toward the assembly target 120 such as a bearing. As an example, the assembly target 120 may be a double ball bearing.

A motor that is applied to a hybrid vehicle includes a motor stator 101, a magnet 102, and a motor rotor configured integrally with the engine clutch retainer 110.

The assembly hole 111 should be formed as a hole having a size enough to allow the coupling member 140 to freely pass therethrough and an assembling operation to be smoothly performed when assembling the coupling member 140.

The coupling member 140 is inserted into the assembly target 120 side through the assembly hole 111 to assemble the assembly target 120 so that the assembly target 120 is fixed to a fixing target such as a support 170. As an example, the coupling member 140 may be a bolt.

After the assembly operation of the coupling member 140, the assembly hole 111 is sealed by a sealing cover 150. As the assembly hole 111 is sealed by the sealing cover 150, oil leakage through the assembly hole 111 is prevented, thereby preventing the operating oil pressure P of the engine clutch from leaking. As a result, the operating oil pressure P is formed between the engine clutch retainer 110 and the engine clutch piston 130, so that the engine clutch can be smoothly operated.

The engine clutch retainer 110 is provided with an accommodation part 112. The sealing cover 150 is correspondingly coupled to the accommodation part 112. The accommodation part 112 is provided on the engine clutch piston 130 side, and the assembly hole 111 is provided on the assembly target 120 side. The accommodation part 112 communicates with the assembly hole 111 concentrically. The accommodation part 112 is configured as a hole larger than the assembly hole 111.

As an example, the sealing cover 150 may be provided on an outer circumference with a watertight member 160. The watertight member 160 may be a rubber ring. The watertight member 160 may prevent oil leakage by sealing a portion in contact with the accommodation part 112.

The sealing cover 150 includes a through-hole 151 provided at a center and a recessed part 152 provided around the through-hole 151. The recessed part 152 is provided on a surface facing the engine clutch piston 130. The recessed part 152 is recessed along a circumference of the through-hole 151. The recessed part 152 is formed in a circular shape.

Specifically, the recessed part 152 includes a recessed surface 152a, an inner ring portion 152c, and an outer ring portion 152d.

A tool engaging portion 152b is provided on the recessed surface 152a. As an example, the tool engaging portion 152b may be a rib. The assembled sealing cover 150 can be easily disassembled by pulling the tool engaging portion 152b using a tool such as tongs.

As an example, two tool engaging portions 152b are preferably provided to face each other on the recessed surface 152a. When the sealing cover 150 is pulled with two tools being bitten on the two tool engaging portions 152b, the force of pulling the sealing cover 150 acts evenly on both sides, so the assembled sealing cover 150 can be easily disassembled.

The inner ring portion 152c continues with the recessed surface 152a and configures an inner ring. The inner ring portion 152c is configured on an inner side of the recessed surface 152a. The inner ring portion 152c is configured as an inclined surface whose width increases from an inner side toward an outer side.

The outer ring portion 152d continues with the recessed surface 152a and configures an outer ring. The outer ring portion 152d is configured on an outer side of the recessed surface 152a. The outer ring portion 152d is configured as an inclined surface whose width increases from an inner side toward an outer side. The outer ring portion 152d is configured as an outer ring having a larger diameter than that of the inner ring portion 152c.

The assembly target 120 is provided with a rim portion 121. The rim portion 121 extends outward from an outer circumference of the assembly target 120. The rim portion 121 is provided with a coupling hole 121a. As an example, the coupling hole 121a preferably has a shape corresponding to a bolt head so that the bolt head can be accommodated therein.

The coupling member 140 is screwed to the support 170 in a state of passing through the assembly hole 111 and being inserted into the coupling hole 121a.

The coupling member 140 is assembled in a state where the assembly hole 111, the coupling hole 121a and the screw coupling portion of the support 170 are located on a straight line.

The assembly target 120 rotatably supports the engine clutch retainer 110 in a state of being fixed to the support 170 by the coupling member 140.

Next, an assembling process of the present invention will be described.

Figure 4:
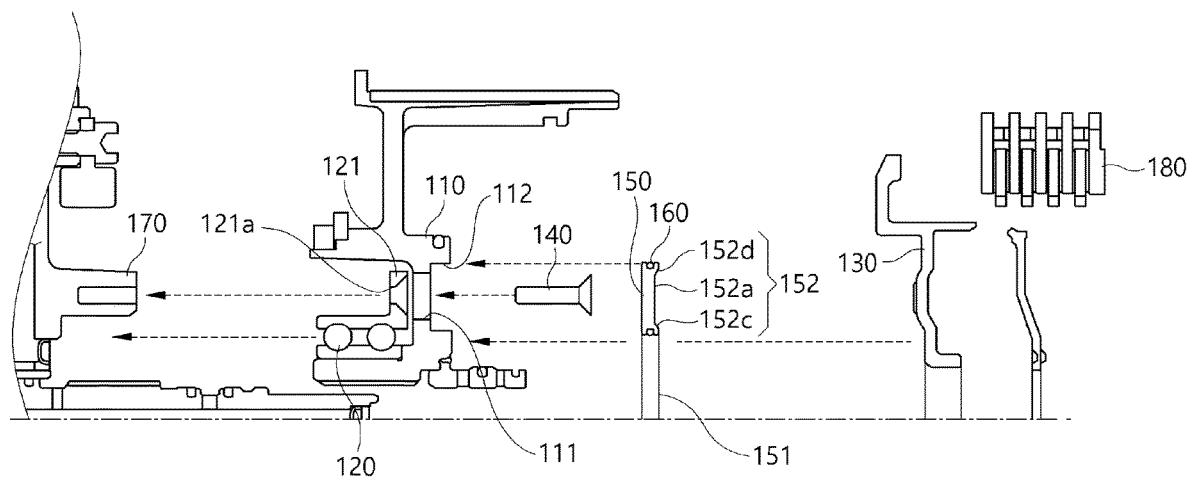
FIG. 4 is a view showing an assembling process according to a preferred embodiment of the present invention.

FIG. 4 is a view showing an assembling process according to a preferred embodiment of the present invention.

As shown in FIG. 4, the assembly target 120 is press-fitted into the engine clutch retainer 110. When the assembly target 120 is press-fitted into the assembly portion of the engine clutch retainer 110 in this way, the coupling hole 121a provided in the rim portion 121 of the assembly target 120 naturally coincides with the assembly hole 111.

The coupling member 140 is inserted into the assembly hole 111 from the engine clutch piston 130 side. The coupling member 140 inserted into the assembly hole 111 is screwed to the assembly portion of the support 170 through the coupling hole 121a.

After the assembly target 120 is assembled so that it is fixed to the support 170 by the coupling member 140 in this way, the assembly hole 111 is sealed with the sealing cover 150.

Specifically, when the sealing cover 150 is correspondingly coupled to the accommodation part 112 of the engine clutch retainer 110, the assembly hole 111 communicating with the accommodation part 112 is sealed by the sealing cover 150. This makes it possible to prevent the operating oil pressure between the engine clutch retainer 110 and the engine clutch piston 130 from being leaked toward the assembly target 120 through the assembly hole 111.

After the assembly of the sealing cover 150 is completed, the assembly of the engine clutch piston 130 and the clutch disk 180 is sequentially performed.

When the sealing cover 150 is coupled to the accommodation part 112, the watertight member 160 on the outer circumference of the sealing cover 150 is in close contact with an inner circumferential surface of the accommodation part 112, so that a firm watertight state can be achieved.

As described above, the present invention can reduce noise and vibration of a hybrid vehicle and improve performance by strengthening the engine clutch retainer support by the assembly target such as a double ball bearing. In addition, according to the present invention, the engine clutch can be smoothly operated by blocking the assembly hole provided in the engine clutch retainer with the sealing cover, resulting in formation of an operating oil pressure between the engine clutch retainer and the engine clutch piston.

Although the technical idea of the present invention has been described for illustrative purposes with reference to the above embodiment, one skilled in the art will appreciate that various modifications, changes and substitutions can be made without departing from the scope and spirit of the present invention as disclosed in the accompanying claims. Therefore, the embodiments and accompanying drawings of the present invention are presented only for illustrative purposes, not for limiting the technical idea of the present invention, and the scope of the technical idea of the present invention is not limited by the embodiments and accompanying drawings. The protection scope of the present invention should be construed according to the following claims, and all technical ideas within the equivalent range should be construed as being included in the scope of the present invention.

The invention claimed is:

1. An assembly structure of a hybrid transmission comprising:
    an engine clutch retainer having an assembly hole;
    a coupling member configured to be coupled to the engine clutch retainer through the assembly hole; and
    a sealing cover configured to seal the assembly hole,
    wherein the engine clutch retainer has an accommodation hole to which the sealing cover is correspondingly coupled, and the accommodation hole is defined on an engine clutch piston side to communicate with the assembly hole defined on a side of an assembly bearing and is larger than the assembly hole.

2. The assembly structure of a hybrid transmission according to claim 1, wherein the engine clutch retainer is disposed between the assembly bearing and an engine clutch piston.

3. The assembly structure of a hybrid transmission according to claim 2, wherein the coupling member is configured to be coupled through the assembly hole to fix the assembly bearing.

4. The assembly structure of a hybrid transmission according to claim 2, wherein the sealing cover comprises:
    a through-hole defined at a center of the sealing cover; and
    a recessed ring disposed on a surface facing the engine clutch piston and recessed along a circumference of the through-hole.

5. The assembly structure of a hybrid transmission according to claim 4, wherein the recessed ring comprises:
    a recessed surface having a tool engaging portion;

an inner ring portion disposed on an inner side of the recessed surface and has an inclined surface; and an outer ring portion disposed on an outer side of the recessed surface, the outer ring portion having an inclined surface and being larger than the inner ring portion.

6. The assembly structure of a hybrid transmission according to claim 5, wherein the tool engaging portion has a rib.

7. The assembly structure of a hybrid transmission according to claim 2, wherein the assembly bearing has a rim portion, and the rim portion is disposed on an outer circumference of the assembly bearing and has a coupling hole to which the coupling member is correspondingly coupled.

8. The assembly structure of a hybrid transmission according to claim 2, wherein the assembly bearing is configured to rotatably support the engine clutch retainer in a state of being fixed to a support by the coupling member.

9. The assembly structure of a hybrid transmission according to claim 1, wherein a watertight member is disposed on an outer circumference of the sealing cover, and the watertight member is configured to seal a portion in contact with the accommodation hole.

10. The assembly structure of a hybrid transmission according to claim 1, wherein the engine clutch retainer is configured integrally with a motor rotor.

11. The assembly structure of a hybrid transmission according to claim 1, wherein the coupling member has a bolt.

12. The assembly structure of a hybrid transmission according to claim 1, wherein the engine clutch retainer is configured integrally with a magnet.

13. An assembly structure of a hybrid transmission comprising:
    an engine clutch retainer having an assembly hole;
    a coupling member configured to be coupled to the engine clutch retainer through the assembly hole; and
    a sealing cover configured to seal the assembly hole,
    wherein the sealing cover comprises:
    a through-hole defined at a center of the sealing cover; and
    a recessed ring disposed on a surface facing an engine clutch piston and recessed along a circumference of the through-hole.

14. An assembly structure of a hybrid transmission comprising:
    an engine clutch retainer having an assembly hole;
    a coupling member configured to be coupled to the engine clutch retainer through the assembly hole; and
    a sealing cover configured to seal the assembly hole,
    wherein the engine clutch retainer is configured integrally with a motor rotor or a magnet.

* * * * *